United States Patent [19]

Figler et al.

[11] Patent Number: 4,612,639
[45] Date of Patent: Sep. 16, 1986

[54] FAIL-SAFE APPARATUS AND METHOD FOR READING SWITCHES

[75] Inventors: Alan A. Figler, Algonquin; John J. Selman, Vernon Hills, both of Ill.

[73] Assignee: Baxter Travenol Laboratories, Inc., Deerfield, Ill.

[21] Appl. No.: 676,040

[22] Filed: Nov. 29, 1984

[51] Int. Cl.[4] .................... G01R 31/28; G06F 11/00
[52] U.S. Cl. .................................. 371/25; 371/68
[58] Field of Search ................ 371/15, 25, 67, 68, 371/70; 324/73 R, 73 AT

[56] References Cited

U.S. PATENT DOCUMENTS

| | | | |
|---|---|---|---|
| 3,196,391 | 7/1965 | Dubroff et al. | 371/25 |
| 3,238,501 | 3/1966 | Mak et al. | 371/68 X |
| 3,601,804 | 8/1971 | Wainwright et al. | 371/68 X |
| 3,604,906 | 9/1971 | Hunter et al. | 371/67 |
| 3,891,143 | 6/1975 | Haeusler | 371/70 |

Primary Examiner—Charles E. Atkinson
Attorney, Agent, or Firm—Paul C. Flattery; Kay H. Pierce; Daniel D. Ryan

[57] ABSTRACT

A switch and decoder circuit and method of reading same includes a 4 to 16 line decoder latch for selectively enabling up to 14 manually settable switches, each of which generates a BCD code in response to a switch setting, a plurality of thumb wheel switches each of which is selectively enabled by the decoder latch are connected in parallel to a data bus which can then be sensed by associated circuitry. Two pseudoswitches are provided which may be selectively enabled by the decoder latch and which gate onto the address bus two known, non-BCD codes for hardware checking purposes. A control program in an associated processing unit through input/output circuitry can select a switch whose outputs are to be sensed, read asserted and negated values for the switch, compare the values to a predetermined range of allowable values, and cycle the pseudoswitches to determine whether or not the hardware is functioning properly.

16 Claims, 3 Drawing Figures

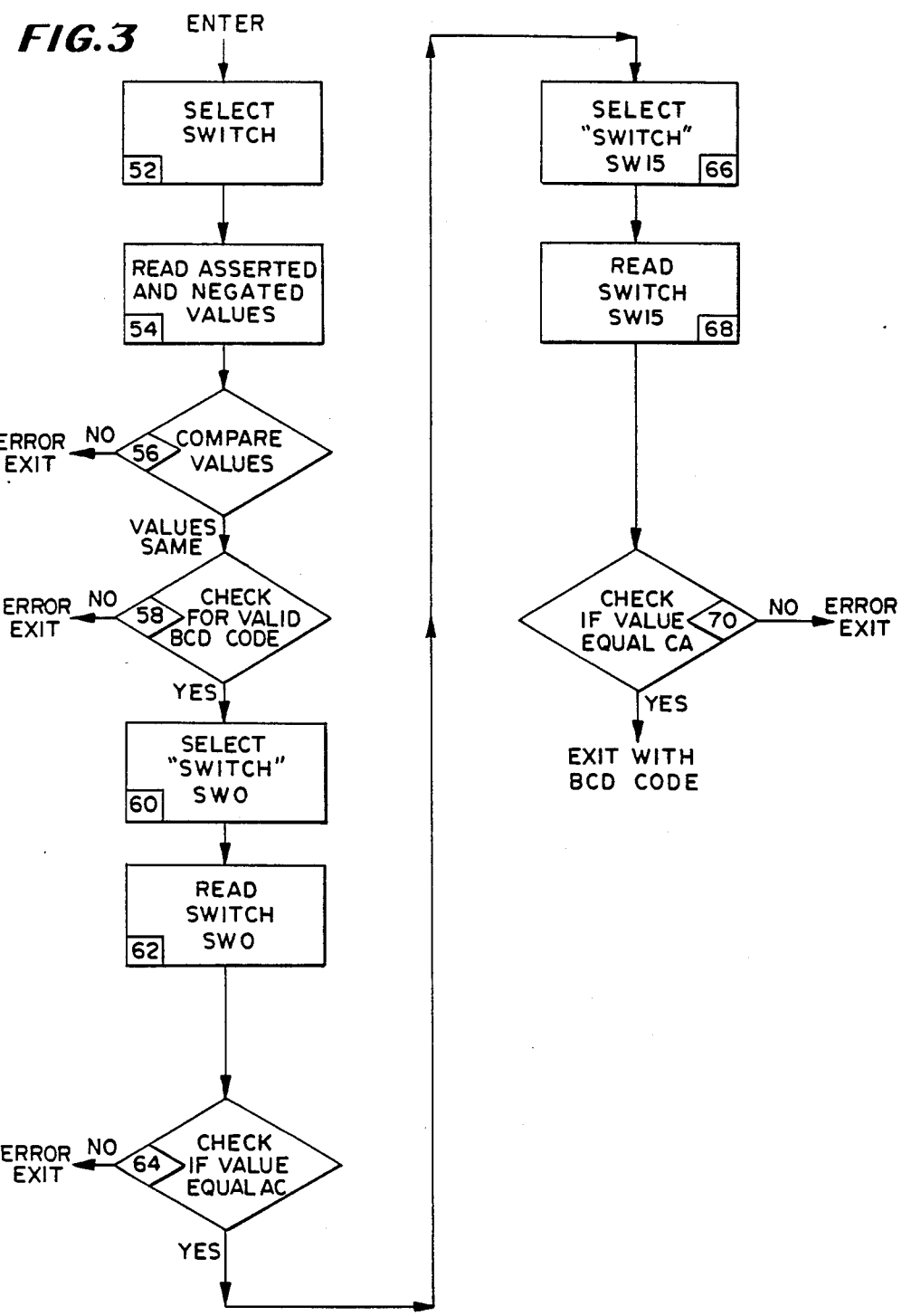

APPARATUS AND METHOD FOR READING SWITCHES

FIELD OF THE INVENTION

The invention pertains to methods and apparatus for automatically reading switch positions for manually settable switches with a high degree of reliability.

BACKGROUND OF THE INVENTION

Many types of electronic instruments provide for manual input of data or information through operator settable switches. The settings of these switches are then read by the related electronic equipment. Very often the information input through these switches is critical to the correct operation of the instrument or apparatus. Hence, it is important to determine as quickly as possible whether or not the switch settings which are being sensed represent reliable information.

One type of commonly used operator settable switch is a thumb wheel switch which converts a switch position to a binary coded decimal (BCD) code which can then be subsequently converted to binary for arithmetic or logic operations. While such switches are reasonably reliable they do from time to time malfunction and generate an incorrect set of electrical signals for a given switch position. Additionally, while the reading and addressing electronics utilized in connection with such switches are also fairly reliable, they too malfunction, from time to time.

There is thus a continuing need for an inexpensive apparatus and method, which will enable an associated electronic circuit to determine whether or not the information being sensed from a manually settable switch or switches is reasonably likely to have been correctly generated by the switches.

SUMMARY OF THE INVENTION

In accordance with the invention an apparatus and a method are provided for sensing and checking electrical signals generated by manually settable switches. An apparatus in accordance with the invention provides for manually settable means for generating a unique electrical signal in response to a selected switch setting, means for sensing said generated signal, means for comparing said sensed signal to a predetermined range of allowable signals including means for setting an error indicia in response to an out of range signal, means for sensing an absence of said error indicia and for performing at least a first hardware error check in response thereto. The apparatus can also provide means for performing a second hardware error check.

Further the apparatus provides for a plurality of manually settable multiposition switches, with each switch generating a unique, selected, electrical signal indicative of each said position. A further embodiment of the apparatus includes means for detecting in parallel both asserted and negated representations of each said electrical signal generated by a switch. The apparatus further provides means for determining if the asserted and the negated representations are the same and for setting an error indicia if not the same.

The apparatus further can include an address checking circuit and means for enabling the address checking circuit, including means for generating a unique checking electrical signal in response to enabling the circuit. The apparatus also can include means for verifying the checking electrical signal and for generating an error indicia in response to an unverified checking signal. The apparatus can also provide means for generating a second unique electrical checking signal in response to enabling the error checking circuit, as well as means for verifying the second checking electrical signal and for generating a further error indicia in response to an unverified second error checking signal.

In an embodiment of the present invention the manually settable switches generate a unique coded binary electrical signal corresponding to each settable switch position.

In accordance with the invention a method of checking and sensing a manually settable switch that generates a unique electrical signal for each switch position includes the steps of selecting a switch, sensing an asserted and a negated electrical signal generated by the switch, comparing the asserted and the negated electrical signals and setting an error flag if different, checking the sensed switch representation, if no error flag has been set, to see if it falls within a predetermined range and setting an error flag if it does not; selecting a check switch; sensing an electrical signal generated by the check switch; comparing the check switch representation, if no error flag has been set, to a predetermined value to see if it equals the predetermined value and setting an error flag if it does not.

BRIEF DESCRIPTION OF THE DRAWINGS

FIG. 3 is a flow diagram of a control program executable by a microprocessor for purposes of implementing part of the method of the present invention.

DETAILED DESCRIPTION OF THE PREFERRED EMBODIMENTS

Figure 1:
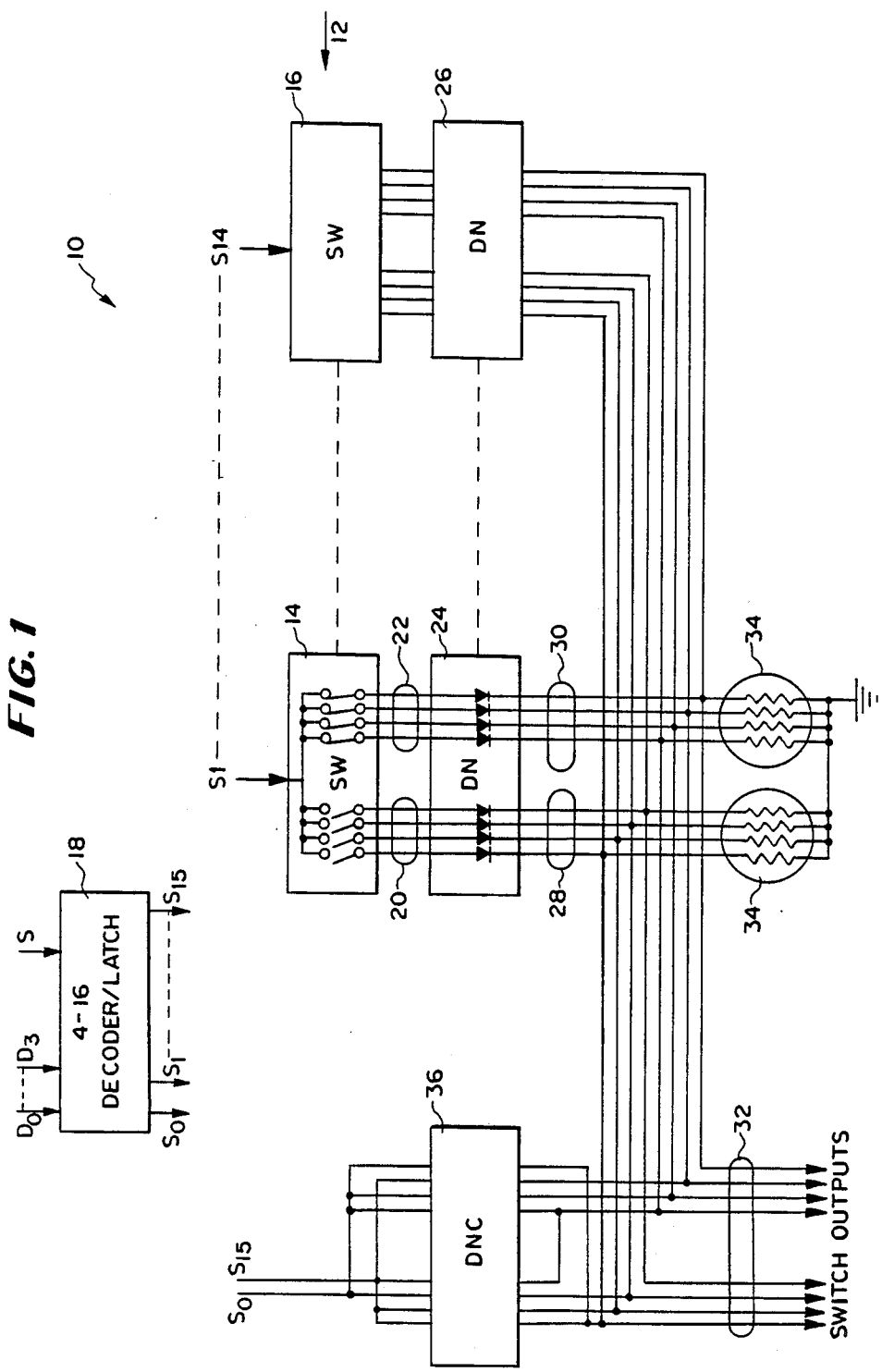
FIG. 1 is a schematic block diagram of a switch and decoder circuit in accordance with the present invention.

With respect to the figures, FIG. 1 illustrates a switch and decoder circuit 10 in accordance with the present invention. The switch and decoder circuit 10 includes a plurality of manually settable thumb wheel switches 12. A total of 14 parallel switches is indicated in FIG. 1 of which only switches 14 and 16 are specifically illustrated. Switch 14 and switch 16 are mechanically mounted in parallel with the twelve remaining switches indicated in dashed lines on FIG. 1. Each of the switches can be identical and the exact number of switches may vary and is not a limitation of the present invention.

Each of the manually settable switches, such as the switch 14 can be uniquely enabled by an electrical signal such as a signal S1 indicated in FIG. 1. A plurality of 14 enabling signals S1 through S14 is provided as illustrated in FIG. 1. At any one time, only one enabling signal S1 through S14 has a true or high state.

The signals S1 through S14 are generated by a four to sixteen decoder latch 18 of a conventional variety. The latch 18 receives four data signals D0 through D3 and a strobe signal S from other electronic circuitry and enables one of 16 lines S0 through S15, with a high voltage signal. Signals S1 through S14 are used to enable the manually settable switches. Signals S0 and S15 are used to enable the switch and decoder circuit 10 to carry out an address checking function as will be discussed further subsequently.

Each of the switches, such as the switch 14 generates a conventional binary coded decimal (BCD) code for each switch position. The exact BCD code is immaterial and is not a limitation of the present invention. Both asserted and negated forms of each code are avaiable in parallel on respective sets of output lines 20 and 22.

Electrically connected to the electrical outputs of each of the switches, such as the outputs 20, 22 of the switch 14, is a diode net DN such as diode net 24. Diode net 24 and diode net 26 are illustrated in FIG. 1. The remaining diode nets are all identical to the elements 24, 26 and are indicated by dashed lines in FIG. 1.

Each of the diode nets, corresponding to the diode net 24, includes 8 diodes with an anode of each diode connected to a respective output of the associated manually settable switch such as the switch 14 of FIG. 1. The purpose of the diode nets such as 24 and 26 is to provide isolation for each of the switches 14 and 16. Each set of 8 cathodes in a diode net is connected to eight corresponding parallel lines, such as the electrical lines 28, 30 illustrated in FIG. 1. The lines 28 and 30 are then electrically connected to respective members of a set of switch output lines 32.

In the exemplary embodiment of FIG. 1 each of the switches, such as switch 14, is a manually settable thumb wheel switch which generates as outputs on the lines 20 and 22, asserted and negated binary coded decimal representations of each of the 10 permitted switch positions. Hence, the electrical signals on the lines 20 and 22 are complements of each other assuming switch 14 is operating properly. The signals on the output lines 28, 30 also are complements of each other in the same way as the signals on the lines 20 and 22.

As each of the switches, such as 14 or 16, is selected by one of the select lines S1 through S14 a corresponding set of signals, representing an asserted and a negated form of a selected BCD switch position is gated onto the switch output lines 32. A set of resistors 34 functions to pull down each of the switch output lines 32 to zero volts when none of the select lines S0–S15 are active.

Connected in parallel with the diode nets DN associated with the switches SW, such as the nets 24 and 26, is a checking diode net 36. The checking diode net 36 has the same structure as does the net 24. The anodes of the diodes in the net 36 are electrically connected as illustrated in FIG. 1 to either the S0 select line or the S15 select line both of which are generated by the element 18. The cathodes of each of the diodes in the checking diode net 36 are each electrically connected to a member of the switch output lines 32 also as illustrated in FIG. 1.

Unlike the situation with respect to one of the thumb wheel switches, such as switch 14, wherein a representation is generated on the lines 20 and 22 corresponding to the thumb wheel switch position, when the signal S1 enables the element 14, the checking diode net 36 always generates a predetermined and known electrical signal in response to the S0 select line. A second predetermined electrical signal is generated by the diode net 36 in response to an electrical signal on the S15 select line. Hence, the diode checking net 36 can be used to determine whether or not the switch and decoder circuit 10 is properly being addressed and/or sensed by the associated electronic circuitry.

In the exemplary embodiment illustrated in FIG. 1, in response to the S0 line being selected, the checking diode net 36 generates a hexadecimal binary code AC on the switch output lines 32. Similarly, when the checking diode network 36 is enabled by the S15 select line a hexadecimal binary code CA is generated on the switch output lines 32. It should be noted that the hexadecimal codes CA and AC generated by the checking diode network 36 in response to the S0 and S15 select lines are not valid BCD codes generated by the switches, such as switches 14 or 16. Hence, their appearance on the lines 32 only takes place in response to carrying out a hardware check using select lines S0 and S15. The parallel switch outputs on the eight parallel switch output lines 32 can then be sensed or detected by the related electronic circuitry.

Figure 2:
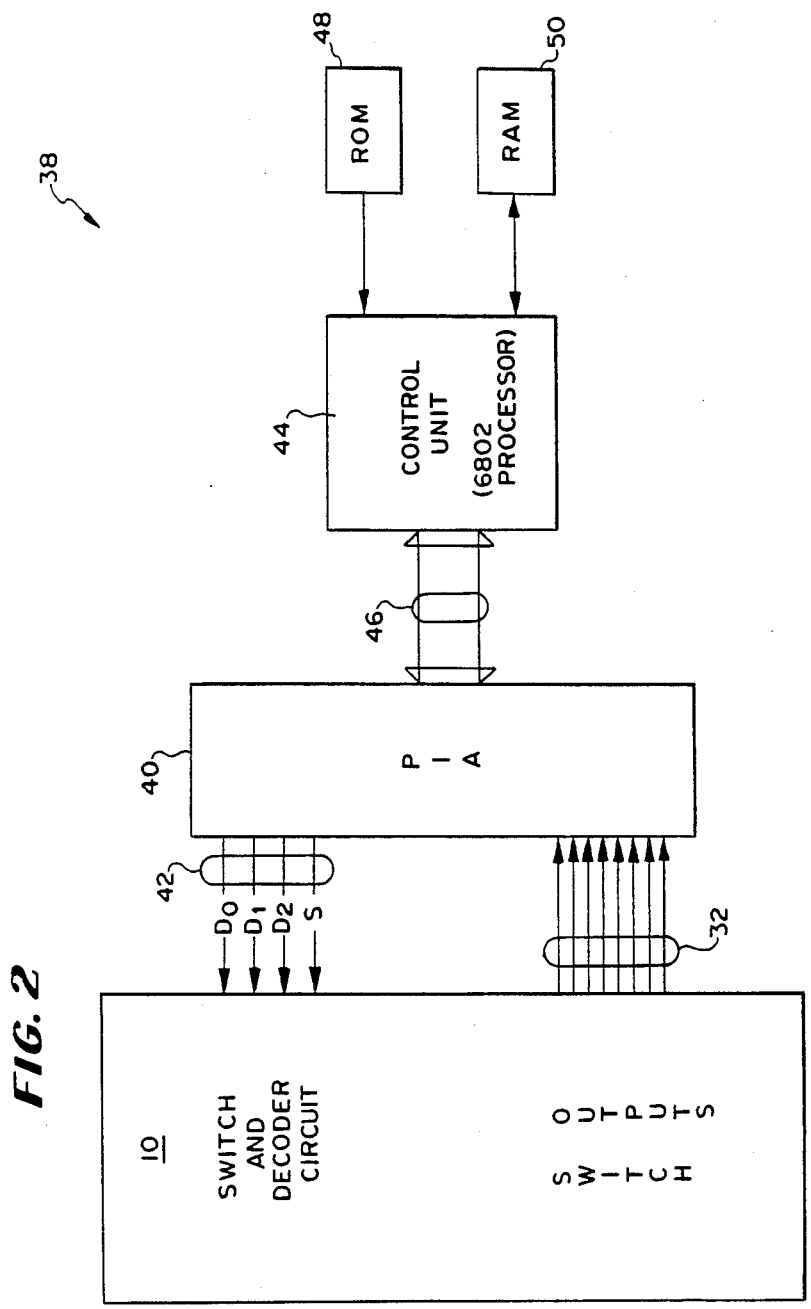
FIG. 2 is a schematic block diagram of the apparatus of FIG. 1 incorporated into a microprocessor based control circuit.

An exemplary circuit 38 which could make use of the switch and decoder circuit 10 is illustrated in FIG. 2. The circuitry 38 includes one or more peripheral interface adapters (PIA) 40 of a conventional variety. The PIA 40 can generate the four data bits D0 through D3 and the strobe bit needed by the latch 18 on a plurality of parallel lines 42. The eight data bits from the switch and decoder circuit 10 can be returned to the peripheral interface adapter 40 on the parallel switch out lines 32. It has been found to be preferred to use two PIAs with four of the switch output lines 32 connected to one PIA and the other four switch output lines from the group of lines 32 connected to the second PIA.

The PIA 40 can communicate with a control unit 44 such as a 6802 microprocessor of a conventional variety by means of a conventional and known bidirectional data bus 46. The control unit 44 includes a read only memory (ROM) 48 for purposes of storing a control program, as well as a random access memory (RAM) 50 for temporary read/write storage. A control program usable in connection with a switch and decoder circuit 10 can be stored in the ROM 48.

FIG. 3 illustrates a flow diagram for an exemplary control program usable with the switch and decoder circuit 10. The control program illustrated in FIG. 3 can be coded as a stand-alone program or as a subroutine that could be part of a much larger control system. It will be understood that the exact mode of use of the switch and decoder circuit 10 and the exact form of the control program of FIG. 3 do not represent a limitation of the present invention. With respect to FIG. 3 the switch and decoder circuit control program is entered at a step 52 wherein a switch is selected to be sensed or read. To select a switch, the control unit 44 transfers a set of data bits through the PIA 40, via the lines 42 to the latch 18 which in turn generates a select signal S1–S14.

In a step 54, the asserted and negated values associated with the selected switch are read off of the switch output lines 32. The control unit 44 then compares the asserted and negated values, which should be identical, in a step 56. If they are not an error exit is made. This error exit is an indicia of a possible switch failure. If the asserted and negated values are the same, the control program then checks, in a step 58, to determine whether or not the sensed value is a legitimate binary coded decimal (BCD) code. If not the program makes an error exit.

If the sensed switch value is a valid BDC code the control program then checks, in a step 60, the operation of the hardware circuitry. In the step 60 a pseudoswitch SW0 is selected by generating a signal on the S0 line of the element 18. The checking diode net 36 in turn responds by gating the hexadecimal code AC onto the switch output lines 32. The processor 44, in a step 62, then reads the values corresponding to the switch SW0. The control unit 44 determines if the sensed value corresponds to hexadecimal character AC in a step 64. If the sensed characters do not correspond to a hexadecimal AC the program makes an error exit. This error exit is an indicia of a possible hardware failure.

If the correct value of AC is sensed in a step 64 a second hardware check is initiated by selecting pseudoswitch SW15. Pseudoswitch SW15 is selected by causing the decoder latch 18 to generate a signal on the line S15, which in turn causes the checking diode net 36 to gate a hexadecimal code CA onto the switch output lines 32. In a step 68 the processor 44 reads the value on the switch output lines 32 and in a step 70 checks to see if the sensed value equals the hexadecimal code CA. If not the program makes an error exit. This error exit is an indicia of a possible hardware failure. If the sensed value equals a hexadecimal code CA in the step 70 the hardware has passed a two part test. The switch and decoder circuit control program illustrated in FIG. 3 returns the correct BDC code sensed from the original selected thumb wheel switch to any other program in the ROM 48 that can make use thereof.

It will be understood that the switch and decoder circuit 10 and the associated method are usable with any desired host electronic system which either may be of a hardwired variety or which can include a control computer. An important advantage of the present invention, both the apparatus and method, lies in the fact that after each physical switch, such as switch 14 has been sensed or read, the pseudoswitches corresponding to SW0 and SW15 are also sensed to determine if the associated hardware appears to be operating properly. This immediate interrogation of the pseudoswitches, combined with the known values that those pseudoswitches, should return results in a high degree of confidence that the system is operating properly at the time each of the physical switches is read. Additionally, by comparing the asserted and the negated values of each of the switches the reliability of each of the individual physical switches is also checked during each read operation.

It will be understood that the switch and decoder circuit 10, as well as the associated control program and the overall method could be used not only with a programmable control unit such as the exemplary control unit 44, but also with any variety of hard-wired control unit that provides the necessary control signals and can sense the data signals returned by the switch and decoder circuit 10.

Modifications and variations of the present invention are possible in light of the above teachings. The broader aspects of the invention include the use of other control units not specifically disclosed herein, as well as other types of conventional input/output circuitry which could be used with conventional switch and decoder circuits of the type disclosed herein. It is therefore to be understood that within the scope of the appended claims the invention may be practiced, otherwise than as specifically described.

What is claimed and desired to be secured by Letters Patent of the United States is:

1. An apparatus for checking sensed switch settings comprising:
   a plurality of manually settable multiposition switches with each switch generating a unique, selected, electrical signal in response to a selected setting of each switch;
   means for sensing said generated signal;
   means for comparing said sensed signal to a predetermined range of allowable signals including means for switching on an error indicia in response to an out of range signal;
   an address checking circuit; and
   means for sensing an absence of said error indicia and for performing at least a first selected hardware error check on said address checking circuit in response thereto.

2. An apparatus as defined in claim 1 wherein said means for sensing include:
   means for detecting in parallel asserted and negated representations of each said electrical signal.

3. An apparatus as defined in claim 2 wherein said comparing means include:
   means for determining if said asserted and said negated representations are complementary and for setting an error indicia if not complementary.

4. An apparatus as defined in claim 3 wherein said hardware error checking means includes:
   means for selectively enabling said address checking circuit including means for generating a unique checking electrical signal in response to said selected enabling.

5. An apparatus as defined in claim 4 wherein said hardware error checking means include further:
   means for verifying said checking electrical signal and for generating an error indicia in response to an unverified checking signal.

6. An apparatus as defined in claim 5 wherein said address checking circuit enabling means include means for generating a second unique checking electrical signal in response to a second enabling.

7. An apparatus as defined in claim 6 wherein said hardware error checking means include further:
   means for verifying said second checking electrical signal and for generating an error indicia in response to an unverified checking signal.

8. An apparatus as defined in claim 5 wherein each said manualy settable switch generates a unique and coded binary electrical signal corresponding to each said position.

9. A method of reading and checking a manually settable switch that generates a unique electrical signal at each switch position comprising:
   selecting a switch;
   sensing at least an asserted electrical signal generated by the switch;
   comparing the asserted electrical representation to a predetermined allowable range and setting an error indicia if the representation exceeds said range;
   selecting a check switch if no error indicia has been set;
   sensing an electrical signal generated by the check switch; and
   comparing the check switch representation, if no error indicia has been set, to a first predetermined value to see if it equals said first predetermined value and setting an error indicia if it does not.

10. A method as defined in claim 9 including in the sensing step:
    sensing both an asserted and a negated electrical signal generated by the switch.

11. A method as defined in claim 10 including:
    comparing the sensed representations and setting an error flag if they are not complementary.

12. A method as defined in claim 11 including:

selecting a second check switch if no error indicia has been set;

sensing an electrical signal generated by the second check switch; and comparing the second check switch representation if no error indicia has been set, to a second predetermined value to see if it equals said second predetermined value and setting an error indicia if different.

13. A method as defined in claim 12 wherein;
said first predetermined value is not a valid switch output electrical signal.

14. A method as defined in claim 13 wherein:
said second predetermined value is not a valid switch output electrical signal.

15. A method as defined in claim 14 wherein:
said first predetermined value corresponds to a hexadecimal code AC.

16. A method as defined in claim 15 wherein:
said second predetermined value corresponds to a hexadecimal code CA.

* * * * *